US 6,559,835 B1

(12) United States Patent
Randall (10) Patent No.: US 6,559,835 B1
(45) Date of Patent: May 6, 2003

(54) TOUCH SCREEN SUPERIMPOSED ELECTRODE CONFIGURATION

(75) Inventor: Mary L. Randall, Buffalo, MN (US)

(73) Assignee: The Bergquist Company, Chanhassen, MN (US)

( * ) Notice: Subject to any disclaimer, the term of this patent is extended or adjusted under 35 U.S.C. 154(b) by 38 days.

(21) Appl. No.: 09/788,721

(22) Filed: Feb. 19, 2001

(51) Int. Cl.[7] .................................................. G09G 5/00
(52) U.S. Cl. ................. 345/173; 178/18.05; 178/19.01; 345/156
(58) Field of Search ................................. 345/156, 157, 345/158–179, 180; 178/18.01, 18.02, 18.03, 18.04, 18.05, 18.06, 18.07, 19.01–19.06, 20.01, 20.02, 20.03, 20.04

(56) References Cited

U.S. PATENT DOCUMENTS 5,736,688 A * 4/1998 Barrett et al. ................. 178/20

* cited by examiner

Primary Examiner—Vijay Shankar
Assistant Examiner—Mansour M. Said
(74) Attorney, Agent, or Firm—Haugen Law Firm LLP (57) ABSTRACT

An improved electrode arrangement for touch screen panels wherein the conductive segments forming the edge arrays and the elongated buses which deliver input signals to the arrays are in stacked superimposed relationship, one to the other. At the respective cross-over points between the buses and the conductive segments, the respective axes are angularly disposed, one to the other, so as to eliminate the creation of an impedance which may adversely affect the accuracy of the output of the touch screen. Each cross-over point is located along a solid portion of the conductive segments comprising the array.

3 Claims, 6 Drawing Sheets

TOUCH SCREEN SUPERIMPOSED ELECTRODE CONFIGURATION

BACKGROUND OF THE INVENTION

The present invention relates generally to an improved touch screen or contact input system, and more particularly to a touch screen having an improved superimposed electrode configuration for supplying power to the screen. The electrode configuration comprises multiple superimposed conductive layers disposed directly or indirectly upon a substrate with the substrate having a resistive film over its entire surface. One of the electrode layers is best characterized as being resistive, while it comprises a network or array of conductive segments which collectively have a configuration or layout with an edge linearization component for enhancing the accuracy of the X-Y input signals as detected. Another one of the electrode layers comprises an array of conductive buses through which an electrical potential is delivered from a power source to selected locations on the array of conductive segments. The arrangement of the present invention provides for stacking of the individual electrodes, thereby increasing the useful area of the screen by substantially reducing the perimeter size requirements. The present invention is an improvement particularly adapted for use with that particular touch system disclosed and claimed in U.S. Pat. No. 5,736,688, Barrett et al., assigned to the assignee of the present invention, the disclosure of which is incorporated fully by reference herein. It should be noted that the present invention may be adapted for use with other touch screen systems, as well.

In the past, contact input systems have been available including screens having conductive segments made of conductive ink or the like and laid out in a configuration or pattern to best linearize electrical fields created in the resistive surface. While the segments are indicated as being "conductive", it will be recognized that only the segments per se are conductive, with the overall array being resistive. Thus, these segments create a network with a resistive property, with the description in this specification being intended to simply define the network of well known segments in the conventional fashion. One highly useful array network or arrangement of conductive segments is disclosed in detail in U.S. Pat. No. 5,736,688. Among the preferred arrays are those utilizing a pattern wherein there is a progressive inward displacement of the conductive segments to linearize the electric fields in the active or useful area of the surface. In other words, the network pattern of each array of segments is such that they collectively are generally inwardly directed or bowed, and may be parabolically configured between opposed spaced-apart corner segments, with each array having a mid-point segment located mid-way between the corners. The corner segments are rectangular in configuration defining a corner apex and includes a contact pad for electrical coupling to the buses. In one particularly desirable configuration, the mid-point segment of each array has a generally "T"-shaped and those conductive segments to the left of the mid-point have a generally "Z"-shaped configuration, with those to the right of the mid-point having a generally inverted "Z"-shape configuration. In order to create the field necessary for touch screen operation, and to enhance the accuracy of these screens, it is essential that the potential or signal applied to each of the opposed corner segments be accurate and consistent. In most applications, the potential applied to each of the spaced-apart contact pads must be equal. The arrangement of the present invention enhances the overall linearity, uniformity, and accuracy of the applied potentials to render the electrical fields created across the surface of the touch screen more uniform as well.

In the past, it has been the practice to arrange the edge arrays of conductive segments and the conductive buses which deliver the electrical energy to the arrays along generally parallel but spaced-apart lanes or paths. In such devices, the conductive buses are spaced laterally apart from the individual arrays of conductive segments. The disadvantage of this arrangement is that a substantial amount of additional perimeter area is required, thus increasing the overall size of the screen. The present arrangement reduces the overall size requirements by careful delineation of the superimposed lanes or paths, as more fully set forth below. Suffice it to say that the superimposed electrode arrangement of the present invention increases the useful area of the screen, thus reducing the overall size requirements.

In other known touch screen systems, the bus is isolated from the resistor network by means of an etch pattern which removes portions of the resistive layer lying between the bus and the resistor network. Still other systems utilize an arrangement wherein the elongated conductive bus is positioned over a dielectric layer, with the dielectric not extending over the resistor network. Such arrangements require greater areas, and for that reason, are less desirable. Certain other known screens employ arrays of conductive segments consisting of spaced-apart linear traces which are positioned along spaced-apart axes. These also require greater perimeter area.

The utilization of the superimposed electrodes is particularly well adapted for use in combination with the bowed electrode configuration, inasmuch as the configuration contributes to a reduction in the power requirements. This reduction taken together with the novel cross-over arrangement results in greater accuracy for the resulting screen system.

In one typical and widely utilized pattern arrangement, the conductive segments are formed generally along two laterally spaced rows of staggered, interspersed or interleaved "T"-shaped segments, with the buses being spaced laterally away from the segments. As indicated above, when the electrodes are laterally spaced apart, additional perimeter area is required, thus reducing the useful area of the finished screen.

In order to enhance accuracy while at the same time reducing the size requirements, highly conductive buses are formed in stacked or superimposed relationship above the surface of the screen. These buses are superimposed upon and electrically isolated from the arrays of conductive segments so as to simultaneously and reliably apply a given or known potential at respective opposed or adjacent corners of the arrays. Given the bowed or inwardly directed parabolic configuration of the conductive segments, and given the objective to minimize the overall size of the screen by maximizing the useful surface, the objective is facilitated by superimposing the buses so that they pass over and intersect the lane or path of the underlying pattern of conductive segments comprising the array. In accordance with the present invention, it has been further determined that the electrical potential applied to the corner segments is accurately delivered when the axes of the intersecting elongated buses and that of conductive segments are angularly arranged at the cross-over points, and with the actual intersection point being located along the main or solid body portion of the conductive segments.

SUMMARY OF THE INVENTION

In accordance with the present invention, therefore, the touch screen assembly providing the contact input to the system comprises an assembly with a substrate, preferably glass, with the substrate surface having an adherent electrically resistive film or coating thereon, normally consisting of indium-tin oxide (ITO). The conductive segments arranged in their inwardly directed parabolic pattern or array, are applied directly over the surface of the resistive film in a conventional fashion, such as by silk-screen, and preferably configured generally in the parabolic configuration disclosed in U.S. Pat. No. 5,736,688. A dielectric layer is applied over the conductive segments and adjacent the edge surfaces of the substrate, with the dielectric layer extending inwardly a distance sufficient to overlie all or a substantial portion of the pattern of the already applied conductive segments. The conductive buses, as referred to above, are in turn applied over the surface of the dielectric barrier coating, and the buses are coupled to the conductive segments, and a flexible film with a resistive film thereon may be attached as a graphical top film or coverlay or overlay to the assembly utilizing an adhesive with good adhesion properties, as is conventional in the field.

Touch input systems are primarily utilized to determine the location of an object such as a conductive stylus touching its surface. Such systems have a wide variety of applications including computer graphics, computer-aided design, and computer-aided manufacturing systems. Other applications include uses in restaurants, information kiosks, control panels for complex machinery, and the like. Such systems frequently require a precise determination of the location of the touch or contact point.

Touch systems may be rendered responsive to single touches or contacts made to the screen. Alternatively, the system may respond to a series of such touches or contacts. These systems may optionally employ the transparent coverlay. The user is able to actuate the system by making finger contact with either the resistive surface of the screen, or the outer surface of the coverlay. Coverlays are not absolutely essential, and useful systems may be designed and utilized wherein the operator touches the resistive surface and provides a ground contact, whereby the X-Y location of touch may be readily determined.

In the past, touch screen systems have employed a variety of techniques or approaches for locating the point of contact providing the input to the system. In any event, the electrical properties of the resistive layer or film of the touch screen are preferably substantially uniform throughout, with resistivities ranging from between about 200–1000 ohms per square being typical. Uniformity and reproduceability of response require that the electrical inputs to and through the resistive film be uniform as well. The network comprising the series of conductive segments applied to the surface of the resistive film are typically more electrically conductive than the resistive surface, and may be silk-screened or otherwise printed onto the surface. The buses which deliver current to the network enable the network to create a first electrical potential or field across the screen surface in a first orientation or direction, and then apply a second electrical potential across the screen surface in a second direction to create a field which may be either orthogonally or perpendicularly disposed to the first field. Consequently, when the surface is touched to create a signal utilizing an operator's finger, stylus, or other means, unique X-Y signals are created which may be translated or interpreted to indicate the precise location of the point where the object touches the screen. The signals obtained are typically analyzed by a comparator or other conventional system, with the inputs to the system being typically generated by a micro-controller equipped with firmware for interpreting the data. Such systems are known in the art. In addition to providing an X-Y location, such systems can be combined with means to determine and provide a "Z"-axis value which may be based upon pressure, location, or other parameters.

With improvements in coating systems such as presently available ITO coatings, the resistive film covering the substrate typically has significantly uniform and predictable resistivity. In order to take full advantage of these improvements and be able to improve the performance of the overall system, however, it becomes necessary to apply highly uniform electrical potentials to and across opposed conductive segments. With the application of uniform potentials, field distortions and nonlinearities are reduced and accuracy of touch point location is enhanced.

As indicated, the universal desire to reduce the size of the screen component renders it necessary to superimpose and electrically isolate conductors including the buses from the network of conductive segments. When implementing the arrangement of superimposed components, it becomes necessary for the individual lanes or paths of the buses and the conductive segments in the array to intersect. An impedance is typically created in the buses at each cross-over point, with the impedance disrupting or interfering with the uniform application of potential.

In accordance with the present invention, uniform application of electrical fields and potential is enhanced and expedited when cross-over points between the elongated buses and arrays of conductive segments comprising the network are arranged with the axes of the elongated buses and the conductive arrays being generally in angular relationship at the point of cross-over. In order to further enhance the uniformity of the field, the cross-over point is positioned along the solid body portion of the "Z"-shaped segment, rather than along one or the other of the laterally extending resistive film contacting leg portions. Therefore, in addition to reducing the overall size of the screen, the reduction is achieved while increasing uniformity of applied electrical potentials.

Further, in accordance with the present invention, an improved edge linearization touch screen panel is provided which comprises a generally rectangular substrate with a surface coating of uniform resistivity applied thereon and with a plurality of elongated segmented conductors being formed on the surface of the resistive coating. The segmented conductors are arranged in a network serially along the side comprising the periphery of the substrate, and in a generally inwardly directed parabolic pattern. Each peripheral series of elongated conductive segments has opposed spaced apart right angle corner segments with a mid-point segment interposed therebetween, and with each remaining segment in the series being of substantially complementary "Z" and inverted "Z"-shaped configurations. Each segment in the series has a central wide body portion disposed between a pair of laterally positioned outwardly extending legs, and each corner segment is designed to receive and make electrical contact with a contact pad through an elongated conductive bus, all as set forth below.

In its preparation, the substrate is provided with an adherent/coherent electrically resistive film, typically ITO, and such substrates are commercially available. Arrays or networks of conductive segments along with the corner segments are applied over the resistive film and a dielectric layer or film is applied over the segments. An array of input and output contact pads or terminals is then formed adjacent one edge of the substrate and over the surface of the dielectric layer, with the contact pads being arranged to be in circuit with inputs from an appropriate device such as a power supply and also with detector systems or mechanisms. Selected ones of the input contact pads are, in turn, electrically coupled to the corner segments through the elongated highly conductive buses. These buses each extend along a path from the contact pads to its selected corner segment, with portions of the buses necessarily intersecting and overlying individual conductive segments at one or more discrete cross-over points.

Each of the cross-over points is disposed along the central body portion of an individual "Z"-shaped conductive segment. Given the close proximity of the buses to the conductive segments, an electrical impedance is created in the buses with the impedance being manifested or represented in differences in applied voltage being seen at different corner segments. Differences in applied voltage may also be detected at the same corner segment depending upon the immediate operating conditions of the touch screen. In other words, this impedance or interference may be variable from one bus to another and it has been found to produce undesirable and unpredictable results. In order to reduce the effect of this impedance, the geometry or path of each bus is modified so that the individual cross-over points between the buses and the conductive segments occur only at locations where the respective axes are in an angular relationship. In other words, the respective axes of the elongated buses and conductive segments are in an angular relationship immediately at the cross-over points.

Therefore, it is a primary object of the present invention to provide an improved touch screen with a novel superimposed electrode configuration which maximizes the useable area of the screen, thereby minimizing overall screen size while facilitating the application of uniform electrical potentials at spaced-apart portions of the screen.

It is a further object of the present invention to provide an improved touch screen arrangement with an electrode configuration having cross-over points between spaced-apart conductors, wherein the cross-over points are arranged in angular relationship, one to another, with this arrangement facilitating a reduction in screen size, while at the same time, improving the uniformity of applied electrical potentials to the screen.

Other and further objects of the present invention will become apparent to those skilled in the art upon a study of the following specification, appended claims and accompanying drawings.

DESCRIPTION OF THE PREFERRED EMBODIMENT

Figure 1:
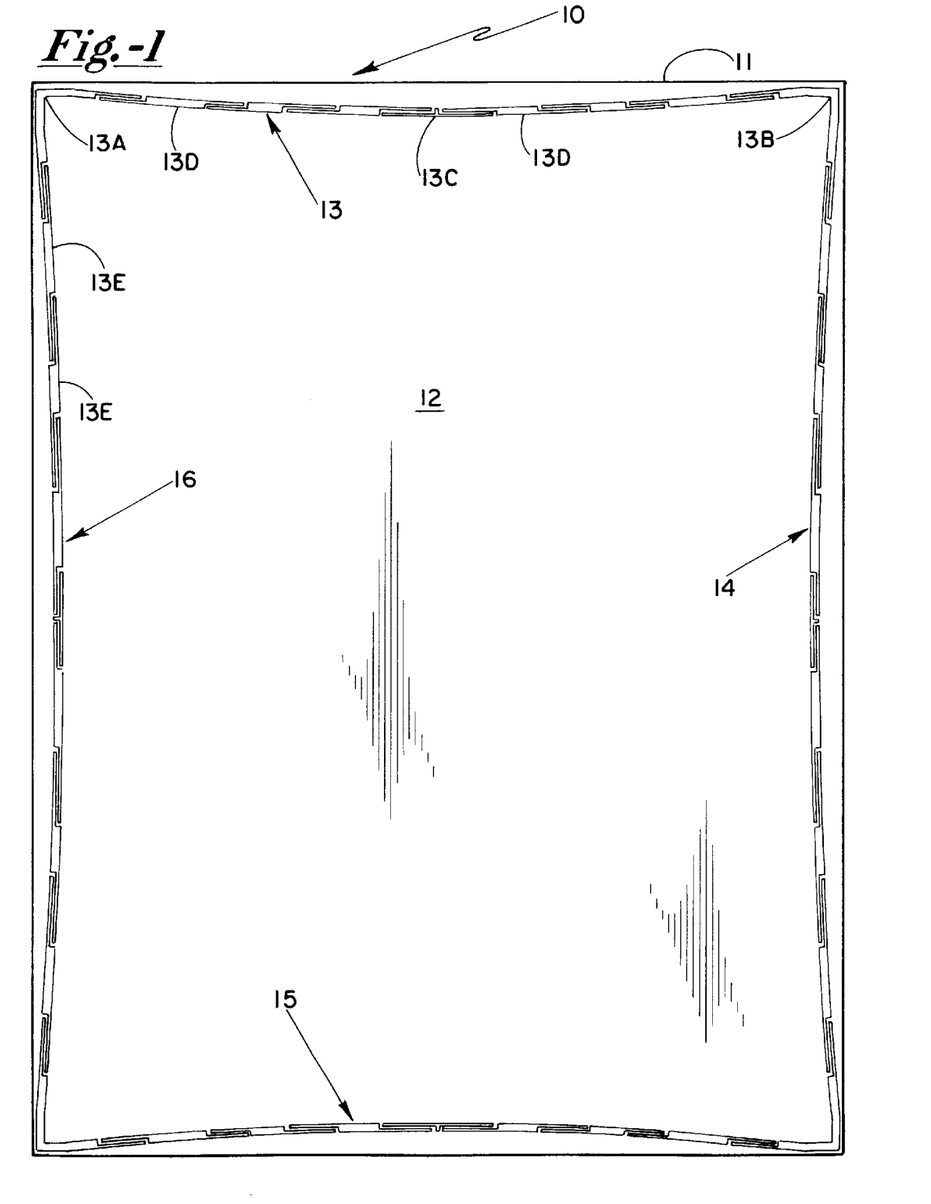
FIG. 1 is a top plan view of the layout of the network of conductive segments arranged in a configuration to achieve edge linearization in accordance with the present invention.

In accordance with the preferred embodiment of the present invention and with particular attention being directed to FIG. 1, the touch screen assembly generally designated 10 includes a substrate 11 having a resistive layer such as an ITO film 12 formed thereon, and over which is formed the network or series of conductive segments such as shown in the individual segment series 13, 14, 15 and 16. As is apparent, each of the series of conductive segments 13–16 inclusive includes opposed corner segments as at 13A and 13B along with a central segment 13C interposed between a series of "Z"-shaped segments 13D and a series of inverted "Z"-shaped segments 13E. Each of the series of segments 13–16 inclusive is so configured. As indicated hereinabove, these conductive segments and networks are formed in accordance with the disclosure set forth in U.S. Pat. No. 5,736,688. Substrates having ITO resistive surfaces of the type utilized in touch screens are commercially available.

Figure 2:
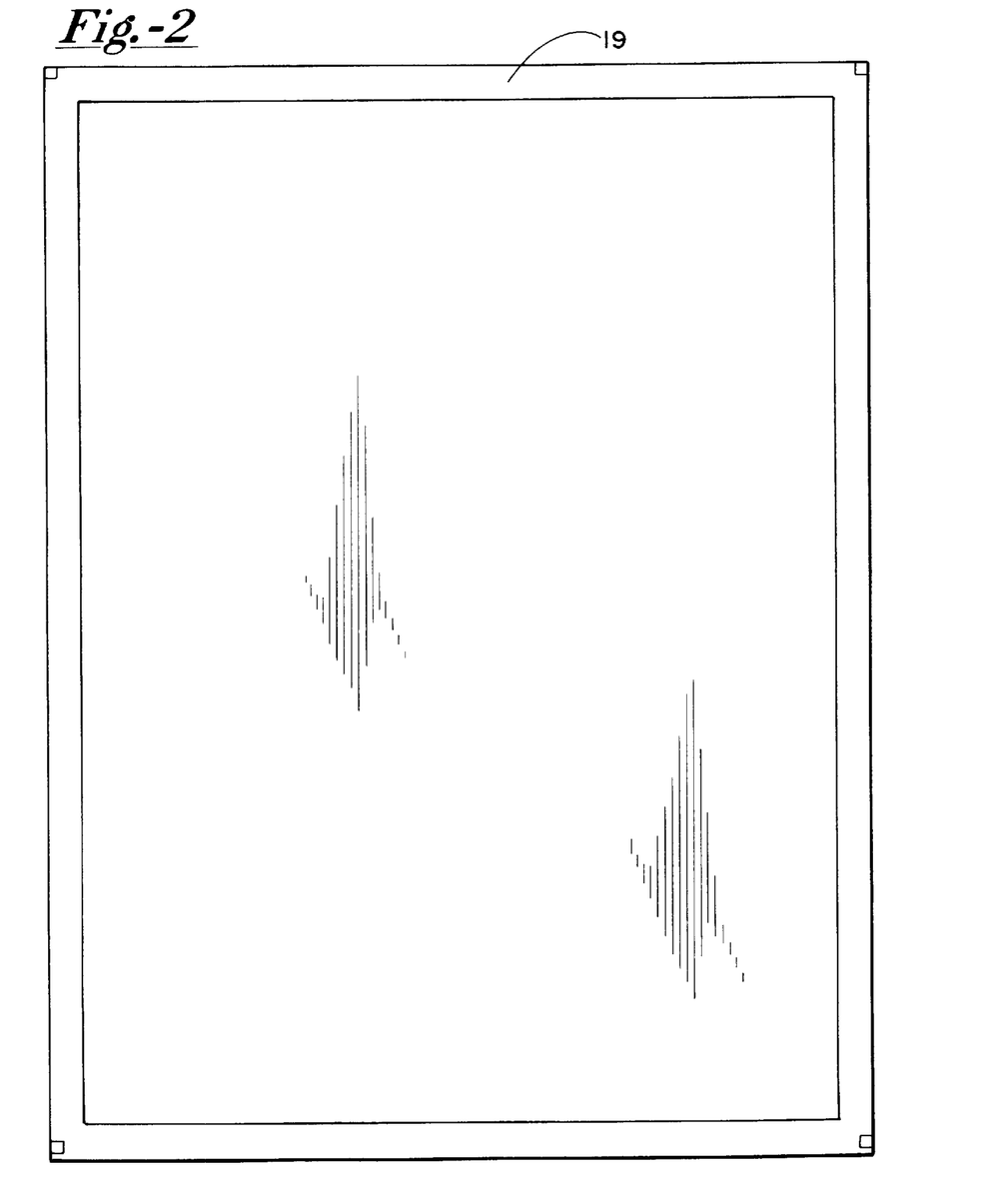
FIG. 2 is a top plan view of the substrate of FIG. 1 with the dielectric layer superimposed over the conductive segments of FIG. 1, and with the network being removed.
Figure 3:
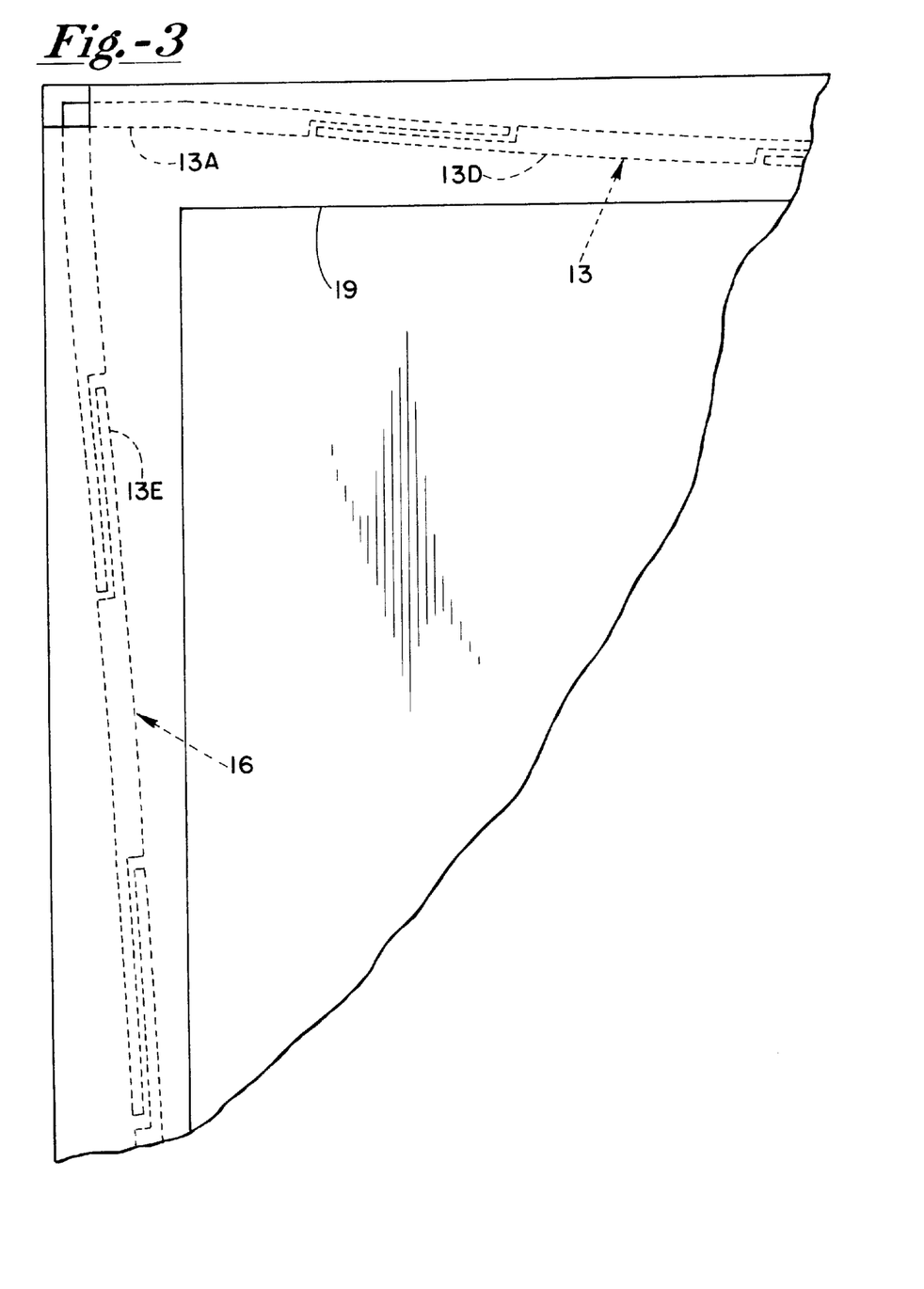
FIG. 3 is a detail plan view on an enlarged scale, partially broken away, and illustrating the lower right hand corner of the features illustrated in FIGS. 1 and 2, with portions of the network of conductive segments underlying the dielectric layer being illustrated in phantom.

With attention now being directed to FIGS. 2 and 3 of the drawings, a dielectric layer such as illustrated at 19 is formed upon the surface of conductive segments 13–16 inclusive. As indicated in FIG. 3, dielectric layer or film 19 overlies the entire lengths of the individual series of conductive segments, with the exception of the corner pads.

Figure 4:
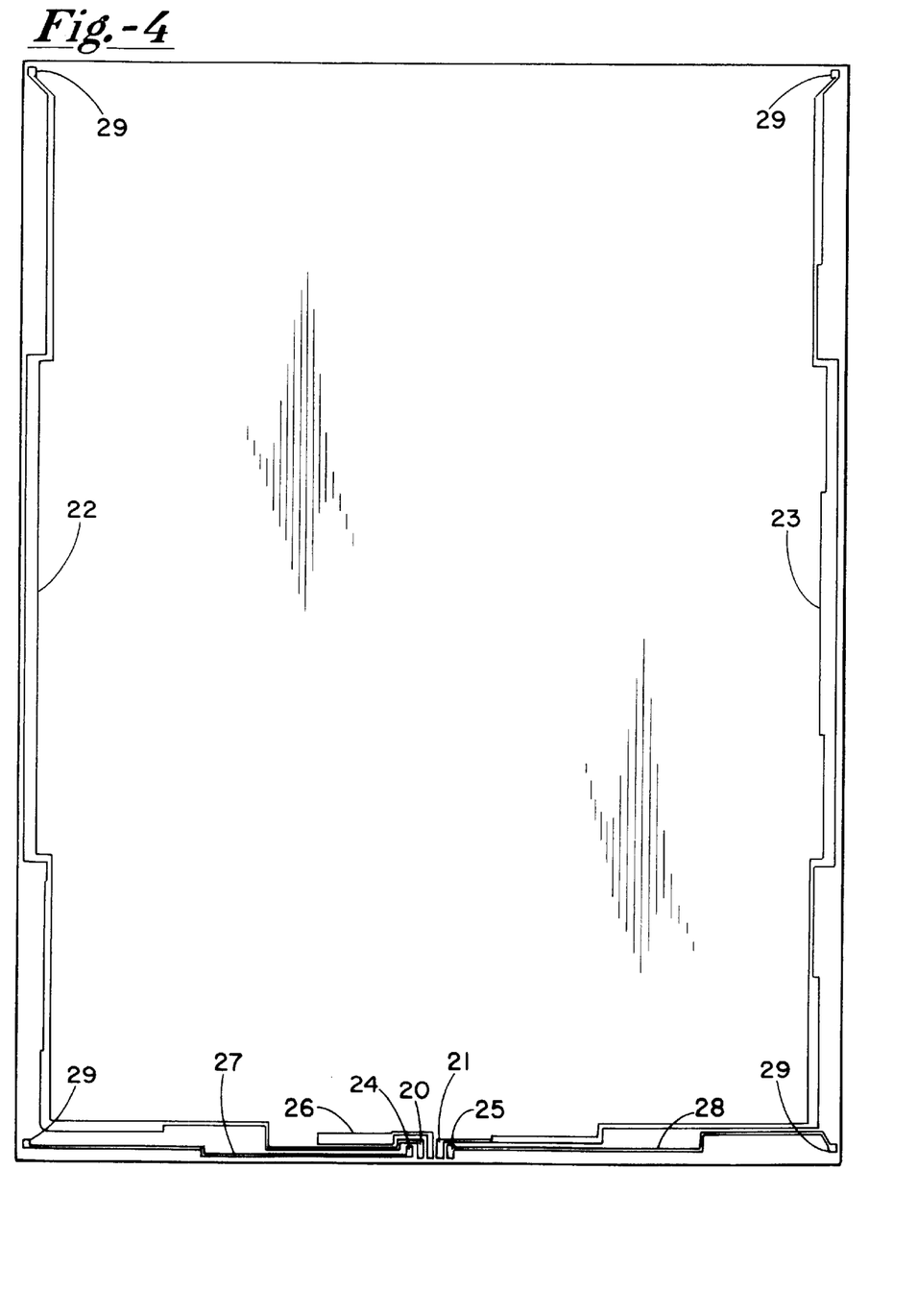
FIG. 4 is a top plan view of the arrangement of the contact pads and elongated buses utilized to provide the electrical energy needed for creation of the electrical fields during operation, with the network and dielectric layers removed.

With attention now being directed to FIG. 4 of the drawings, an arrangement of elongated buses together with an array of contact input pads is shown, with the buses and pads being formed on the outer surface of dielectric layer 19. With continued attention being directed to FIG. 4 of the drawings, it will be observed that contact input pads 20 and 21 are provided for the proximal ends of elongated buses 22 and 23 respectively. Furthermore, contact input pads 24 and 25 are in circuit with elongated buses 27 and 28 respectively. Each bus has at its distal tip a contact pad, such as contact input pads 29—29, for establishing electrical contact with the respective corner segments such as corner segment 13A which is electrically coupled to a contact input pad 29. Other corners are similarly coupled.

The contact input system is electrically coupled to each of the contact pads 20, 21, 24 and 25 utilizing an appropriate signal generator (not shown) for selectively applying an electrical potential across individual conductive segments 13, 14, 15 and 16 and a detector for determining the signal response. For a typical five-wire pattern, an additional contact pad as at 26 is provided, with this pad typically being coupled to the inner surface of the graphical top film (when utilized) by means of a conventional "Z" axis coupler. In this connection, an electrical potential may be applied across network of segments 13 and corner segments 13A and 13B to establish a field along the side adjacent conductive segments in series 13. An appropriate electrical potential may be applied across the network on opposed side 15. Selective application of electrical potentials may also be applied across segments of opposed sides 14 and 16. As illustrated in FIG. 4, the signal generator (not shown) is electrically connected to selected corner segments to create the potential across opposed sides in an alternating fashion, it being noted that appropriate electrical potentials can be selectively applied across the surface and other ways as well.

When contact is made across the surface 12 and the overlay, the signals created are readily translated into the X-Y position of the contact point.

The electrical fields created in the resistive layer may be arranged across opposed surfaces, or alternatively may be created to produce orthogonally configured electrical fields across adjacent edge surfaces. The touch, either through a finger or conductive stylus produces voltage signals at the stylus which are proportional to the coordinates of the location of the contact point. Alternatively, the X-Y coordinate of a conductive pointed stylus may be determined by passing current through the stylus into the resistive film, and measuring the current responses at three or more spaced apart conductive pads or electrodes disposed along the edge surfaces, typically at spaced locations along the network of conductive segments 13–16 inclusive.

Figure 5:
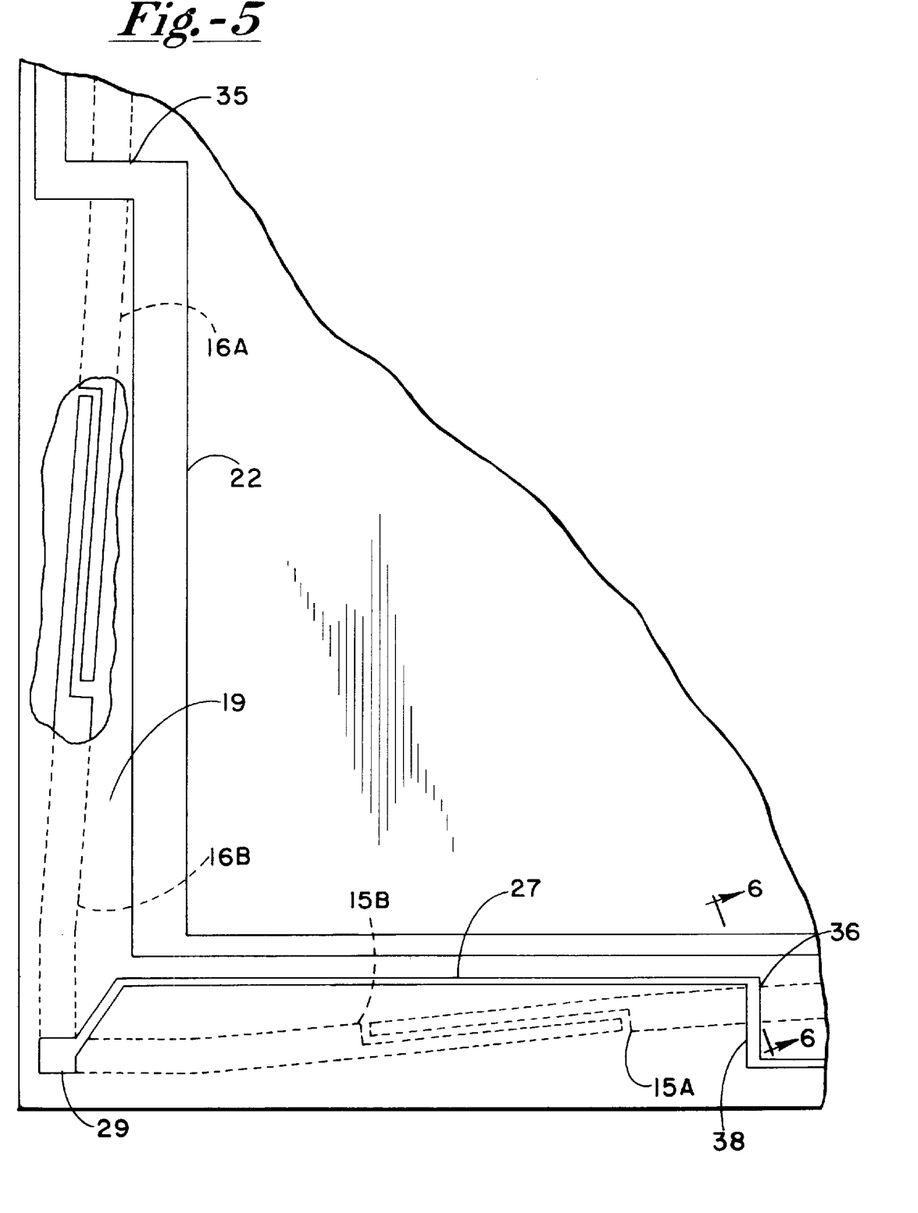
FIG. 5 is a detail view similar to the view of FIG. 3, and illustrating the arrangement of the individual cross-over points between the buses and the respective conductive segments in the linearization pattern.

In order to assure simultaneous application of equal and known potential to the individual corner points, attention is now directed to FIG. 5 for a description of the geometry of the cross-over points between the elongated buses and the underlying conductive segments. In the detail illustrated in FIG. 5, cross-over points as at 35 and 36 along bus 22 are illustrated. These cross-over points 35 and 36 are arranged in angular relationship to the body portions 15A and 16A of conductive array 15 and 16 respectively. In other words, the cross-over points are arranged and/or disposed in the solid body portions of the conductive segments, and specifically not in the resistive zones between the solid body portions, as indicated in FIG. 5, particularly in that portion exposed by cutting away a segment of the resistive film 19. This arrangement of cross-over geometry results in reliable simultaneous application of known potentials to the corner segments. In a like fashion, cross-over point 38 consists of an angular relationship between bus 27 and body portion 15B of network series 15. As further indicated in FIG. 5, bus 27 is electrically coupled directly to corner element 16B.

Figure 6:
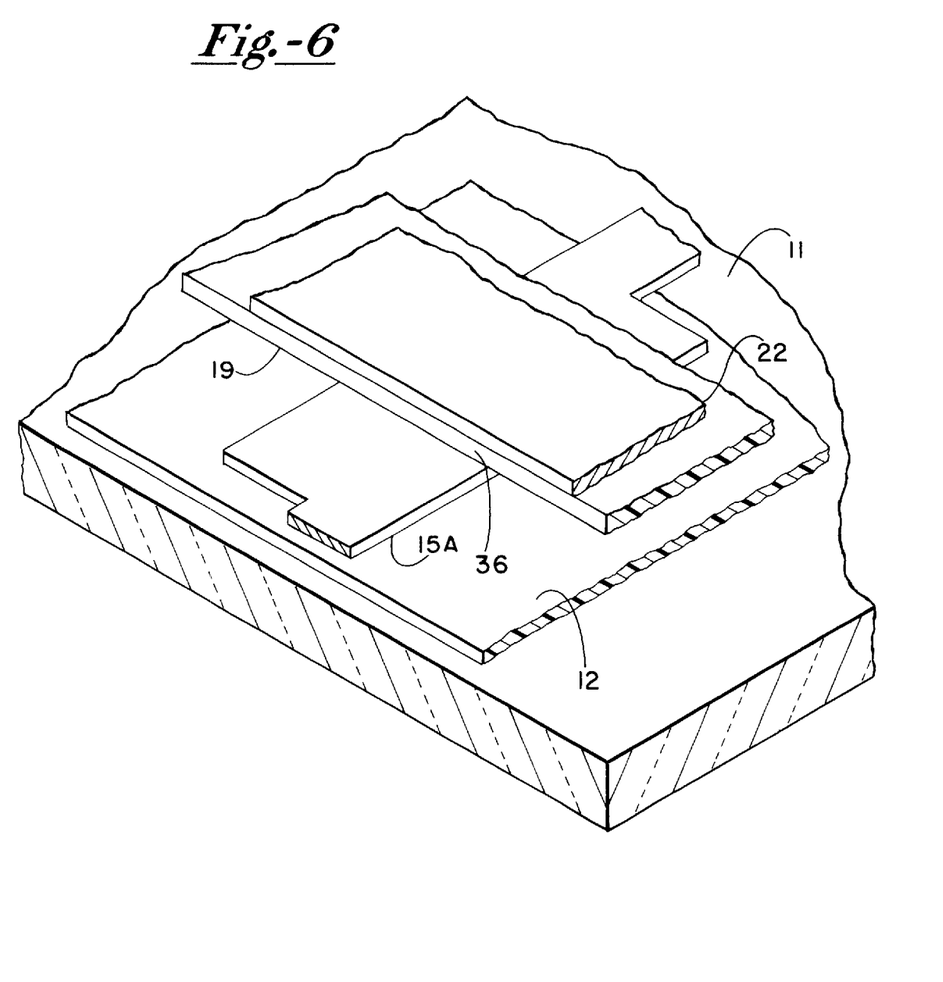
FIG. 6 is a fragmentary view of a portion of the assembly of FIG. 5, and taken generally through and adjacent a cross-over point of the type illustrated in FIG. 5 as at 6—6.

The geometrical and stacked relationship between the individual layers is further represented in FIG. 6 of the drawings. By way of example, this enlarged view illustrates the relationship between the individual layers, and by way of further example, is taken through that segment of the assembly occupied by body 15A of the conductive segment illustrated in FIG. 5.

In certain applications, it may be helpful to have a dielectric layer arranged in superimposed relationship to the elongated buses, with such dielectric layer being configured as layer 19.

PROCESS PROCEDURES

In the preparation of a typical touch screen in accordance with the present invention, the glass substrate with sputtered resistive coating thereon (ITO) is washed, dried, and inspected for uniformity. The resistive film 12 applied to the surface of the glass is typically one consisting of indium-tin oxide (ITO) and uniformly applied to the surface through sputtering techniques. These films have excellent adhesion to glass substrates, and are commercially available. A resistive screen pattern is then prepared upon the surface, and in a configuration shown at 13–16 inclusive in FIG. 1. The resistor network pattern is applied at a uniform thickness, with the application thickness being well within the skill of the artisan. Suffice it to say that the applied thickness is selected to obtain the desired conductivity/resistance along the network. This parameter of the network is, of course, also known and within the skill of the artisan.

Following the cure of the screen pattern, a layer of dielectric film 19 is then applied over the resistor networks 13–16 inclusive. The dielectric preferably has a thickness of about 1.4 mils, with such dielectric materials being, of course, commercially available. Certain dielectric materials may be satisfactorily utilized with either a greater or a lesser thickness dimension. The dielectric layer of this film is preferably cured through UV exposure. UV curing of the individual dielectric layers is deemed desirable, and enhances uniformity in the finished product. An appropriate dosage of UV exposure is provided in order to assure full cure. One such material commercially available is from Acheson Colloids Company of Port Heron, Mich. under the trade designation "ML25265". When cured and dried, this dielectric is highly effective as an insulator on indium-tin oxide sputtered films, and is also compatible with silver and carbon conductive inks.

The buses are then formed upon the surface of the dielectric, with the buses being applied as a pattern through conventional silk screen techniques. The buses are produced in the selected patterns, and may be formed of the same conductive coating as utilized for the resistive pattern, with the thickness being, of course, sufficient to provide adequate conductivity. Again, screen printing of the buses is an operation well known to the skilled artisan.

Conductive silver epoxy coatings are preferred and are widely available commercially, including those which are heat curable two-part formulations. The silver-filled epoxy coatings typically have low volume resistivity and exceptional hardness, thereby finding application for use as the buses.

What is claimed is:

1. In an edge linearization device for touch screen panels comprising a generally rectangular substrate with an electrically resistive surface coating of substantially uniform resistivity thereon, a plurality of elongated conductive segments on said resistive coating and arranged generally along each of the sides comprising a periphery of the coated substrate and in an angular inwardly directed parabolic formation, thereby creating a conductive segment pattern with the elongated conductive segments along each of the sides having opposed spaced apart corner segments with a respective mid-point segment interposed therebetween, each segment disposed between respective corner segments and respective mid-point segments being of substantially Z-shaped configuration with a main wide body portion disposed between a pair of laterally outwardly extending legs, with the substantially Z-shaped conductive segments along each side being positioned between opposed corner and mid-point segments, the touch screen panel being characterized in that:

(a) a dielectric barrier layer being disposed upon an upper surface of said pattern of conductive segments;

(b) an array of contact pads being disposed on a portion of said dielectric layer with selected ones of said contact pads making electrical contact with selected ones of said corner segments;

(c) a plurality of elongated conductive buses each extending along a path between selected ones of said contact pads and selected ones of said corner segments and intersecting the path of said conductive segments, wherein said elongated conductive buses overlie certain portions of the pattern of conductive segments at predetermined cross-over points; and (d) each of said cross-over points being disposed only along the main body portion of said Z-shaped segments and with the respective axes of said Z-shaped conductive segments and said elongated conductive buses being in angular relationship with respect to one another at each of said cross-over points.

2. The touch screen panel set forth in claim 1 wherein at least two corner segments include a pair of conductive portions disposed at right angles and at an apex formed between said intersecting conductive portions.

3. The touch screen panel set forth in claim 1 wherein said cross-over points are arranged at and along an offset coupling segment arranged between parallelly disposed spaced apart elongated bus segments.

* * * * *